Jan. 27, 1970     YUTAKA NAKASO     3,491,490

METHOD OF MANUFACTURING A GRINDER WITH SHAFT

Filed Aug. 22, 1967

INVENTOR
YUTAKA NAKASO

BY Stevens, Davis, Miller & Mosher

ATTORNEYS

United States Patent Office 3,491,490
Patented Jan. 27, 1970

3,491,490
METHOD OF MANUFACTURING A GRINDER WITH SHAFT
Yutaka Nakaso, Nagoya, Japan, assignor to Fuji Kikai Seisakusho, Nagoya, Japan
Filed Aug. 22, 1967, Ser. No. 662,349
Claims priority, application Japan, Sept. 1, 1966, 41/57,437
Int. Cl. B24d 7/17; C08g 7/00
U.S. Cl. 51—293      2 Claims

ABSTRACT OF THE DISCLOSURE

A grinder with shaft is made by providing a concave and protruding portions near one end of a grinder shaft by pressing, inserting said concave and protruding portions into an axial bore of a grinder body, and fixing the grinder shaft to the grinder body. The method includes molding with heat and pressure or using a binder for fixing the grinder shaft to the grinder body.

---

This invention relates to a method of manufacturing grinder with shaft, and more particularly to a method of manufacturing grinder with shaft adapted for use in dental instruments and others.

Hitherto, several manufacturing methods have been proposed, and the most simple method of them comprises providing a roulette or grooves on the outer peripheral surface of a grinder shaft and inserting the shaft into a grinder body, for obtaining good fixing condition between the grinder body and the shaft. These conventional methods, however, have defects such that it is difficult to provide the roulette or grooves on the shaft because of small diameter of the shaft. Further, a grinder with shaft manufactured by said conventional methods has defect such that the intensity of shaft is decreased due to the milling process applied and that the shaft loosens when it is used for a certain period of time, thereby unreasonable force is applied to the grinder body and thus the grinder body is liable to break.

An object of this invention, therefore, is to obviate such defects.

Another object of this invention is to provide an improved method of manufacturing grinder with shaft which is simple and easy even in the case where the diameter of shaft is small in size.

Further object of this invention is to provide an improved grinder with shaft with the shaft being attached without using any milling process and having a sufficient strength.

Yet further object of this invention is to provide an improved grinder with shaft wherein the shaft never loosens by using.

These and other objects are obtained by a manufacturing method which comprises forming concave portions and protruding portions near one end of a grinder shaft by pressing, inserting said concave and protruding portions into an axial bore of a grinder body, and fixing the grinder shaft with the grinder body by heating and pressing or adhering.

Other objects and features of this invention will be apparent from the following detailed description taken in conjunction with an accompanying drawing, in which.

Figure 1:
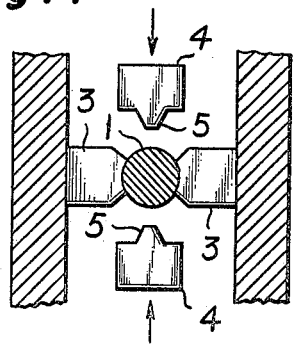
FIG. 1 is a somewhat schematic plan view showing a step of this invention.
Figure 2:
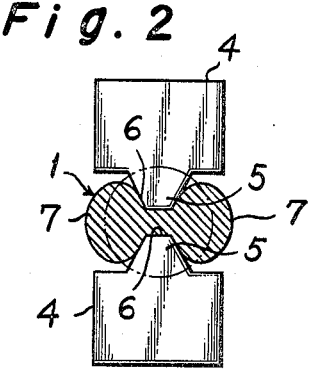
FIG. 2 is a plan view showing an another step of this invention in a somewhat exaggerated scale in FIG. 1.
Figure 3:
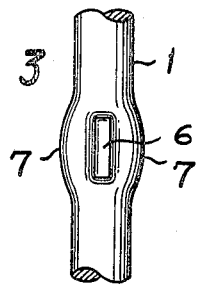
FIG. 3 is a front view of one part of a grinder shaft according to this invention.

In describing the preferred embodiments of this invention illustrated in the drawing, specific terminology will be resorted to for the sake of clarity.

It is not intended, however, to be limited to the specific terms so selected, and it is to be understood that each specific term includes all technical equivalents which operate in a similar manner to accomplish a similar purpose.

Figure 4:
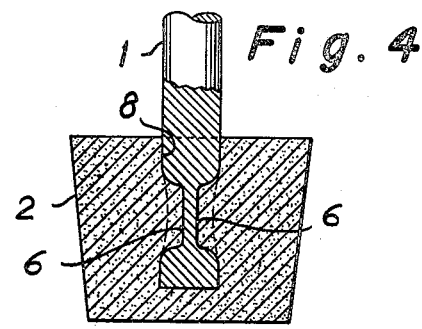
FIG. 4 is a longitudinal sectional front view of a grinder of this invention.
Figure 5:
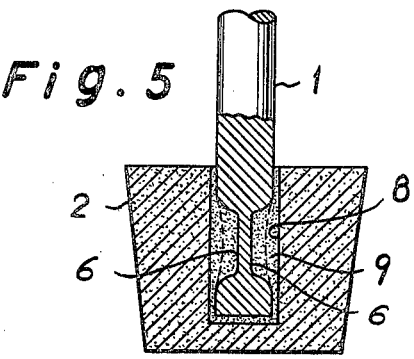
FIG. 5 is a longitudinal sectional front view of a grinder according to the other embodiment of this invention.

Turning now to the specific embodiment of the invention selected for illustration in the drawing, a numeral 1 designates generally a grinder shaft, with one end portion being inserted and fixed into a grinder body 2. The grinder shaft 1 is fixedly supported by supporting tools 3, 3, 3 and 3 at two side face portions spaced apart each other in the axial direction in said one end portion. The upper and lower face portions located intermediate of said two side face portions of the grinder shaft 1 are pressed toward the center axis of the shaft by elongated rams 5 and 5 projected from the metallic bases 4 and 4, respectively, so as to form vertical concave portions 6 and 6 and at the same time to form horizontal protruding portions 7 and 7 on the grinder shaft 1. The one end portion of the grinder shaft 1 formed with the concave portions 6 and the protruding portions 7 is inserted into an axial bore 8 provided at the rotary center of the cylindrical or conical grinder body 2 formed by a grinding material mixed with a binder such as vinyl chloride and rubber etc., and then the grinder body 2 with the grinder shaft 1 are heated and pressed together so as to be molded to form a grinder with shaft. In the grinder with shaft thus obtained, the protruding portions 7 of the grinder shaft 1 bite the grinder body 2 while the concave portions 6 of the grinder shaft 1 are filled with the grinder body 2 so that they are fixed in an engaging state as shown in FIGURE 4. In a case where the grinder body 2 is comprising inorganic materials such as feldspar and siliceous rock, etc., if a binder 9 such as epoxy resins, etc., is filled into the axial bore 8 and then the grinder shaft 1 formed according to the invention as described above is pressed into said bore, the binder 9 is filled in the concave portions 6 of the grinder shaft 1 and the protruding portions 7 is protruded into the binder 9, so that the binder 9 is combined with the grinder shaft 1 in an engaging state and is in intimate contact with the grinder body 2, thereby forming a grinder with shaft as shown in FIGURE 5.

In a conventional grinder with shaft, it is contemplated to increase the coherence of the shaft with the grinder body by making a roulette or grooves on the shaft, however, there are some defects such that it is difficult to form the roulette or grooves on the shaft because of small diameter of the shaft and that the intensity of shaft is decreased due to the milling process applied.

In the present invention, however, the concave portions 6 and protruding portions 7 are formed on the grinder shaft 1 by pressing using the rams 5 formed on the metallic bases 4, so that the concave portions 6 and protruding portions 7 extends into the grinder body 2 or binder 9 and the grinder shaft 1 and grinder body 2 are combined firmly each other, and moreover the grinder shaft 1 is not formed by milling but by pressing using the ram 5, so that the strength of the grinder shaft 1 is never lost and the forming of the shaft 1 is very easy even in the case of small size in diameter, different from by the milling process etc.

Further, in the conventional grinder with shaft there is a defect such that the grinder is liable to break because the shaft loosens and unreasonable force is applied to the grinder body when it is used for considerable period of time, on the contrary, according to the present invention the grinder shaft 1 is engaged in the grinder body 2 through the concave portions 6 and protruding portions 7, so that it is fixed firmly to the thrust direction and the grinder body 2 is not broken even though it is worn until the protruding portions 7 of the grinder shaft 1 is exposed.

It is to be understood that the form of the invention herewith shown and described is to be taken as preferred embodiments. Various changes may be made in the shape and arrangement of parts without departing from the spirit or scope of the invention as defined in the subjoined claims.

What I claim is:

1. A method of manufacturing a grinder disposed on a shaft which comprises pressing toward the center axis of a shaft near one end thereof to provide at least one concave portion and to simultaneously form protruding portions on opposite sides of said concave portion, inserting said one end including said concave and said protruding portions into an axial bore provided in a grinder body, and heating and pressing said shaft and said grinder body to secure said shaft to said grinder body.

2. A method of manufacturing a grinder disposed on a shaft which comprises pressing toward the center axis of a shaft near one end thereof to provide at least one concave portion and to simultaneously form protruding portions on opposite sides of said concave portion, inserting a binder material and said one end including said concave and said protruding portions into an axial bore provided in a grinder body, and hardening said binder material to secure said shaft to said grinder body.

References Cited

UNITED STATES PATENTS

| | | | |
|---|---|---|---|
| 2,800,753 | 7/1957 | Hollstrom | 51—309 |
| 2,984,555 | 5/1961 | Curtis | 51—309 |
| 3,048,160 | 8/1962 | Griffin et al. | 51—309 |
| 3,196,885 | 7/1965 | Emerson | 51—309 |
| 3,362,802 | 1/1968 | Ellis | 51—309 |

DONALD J. ARNOLD, Primary Examiner

U.S. Cl. X.R.

51—298, 308